(12) United States Patent
Pan et al.

(10) Patent No.: US 11,561,630 B1
(45) Date of Patent: Jan. 24, 2023

(54) MENU CONTROL DEVICE

(71) Applicant: PRIMAX ELECTRONICS LTD., Taipei (TW)

(72) Inventors: Yung-Tai Pan, Taipei (TW); Jui-Jen Cheng, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 17/648,939

(22) Filed: Jan. 26, 2022

(30) Foreign Application Priority Data

Dec. 23, 2021 (TW) .................................. 110148349

(51) Int. Cl.
*G06F 3/0362* (2013.01)
*G06F 3/0482* (2013.01)
*G06F 3/038* (2013.01)

(52) U.S. Cl.
CPC ............ *G06F 3/0362* (2013.01); *G06F 3/038* (2013.01); *G06F 3/0482* (2013.01)

(58) Field of Classification Search
CPC ........ G06F 3/033; G06F 3/0362; G06F 3/038; G06F 3/0482
USPC ........................................................ 345/184
See application file for complete search history.

(56) References Cited

U.S. PATENT DOCUMENTS

| 2004/0001042 | A1* | 1/2004 | Lindhout | G06F 3/03543 345/156 |
| 2004/0239629 | A1* | 12/2004 | Koo | G06F 3/0362 345/163 |
| 2010/0288072 | A1* | 11/2010 | Springer | B62D 1/04 74/552 |

* cited by examiner

*Primary Examiner* — Amare Mengistu
*Assistant Examiner* — Gloryvid Figueroa-Gibson
(74) *Attorney, Agent, or Firm* — WPAT, PC

(57) ABSTRACT

A menu control device includes a casing and a roller module. The roller module is installed in the casing. The roller module includes a base, an elastic supporting arm, a scroll wheel, an encoder, a switch element and a microprocessor. The elastic supporting arm is connected with the base. The scroll wheel is pivotally coupled to the elastic supporting arm. The encoder is located beside the scroll wheel. The encoder generates an encoding signal in response to the rotation of the scroll wheel. When an external pressing force is applied to the scroll wheel, the elastic supporting arm is swung toward the switch element, and the switch element is triggered to generate a switching signal. The microprocessor performs an item browsing operation on a menu according to the encoding signal. The microprocessor performs an item selecting operation on the menu according to the switching signal.

7 Claims, 7 Drawing Sheets

MENU CONTROL DEVICE

FIELD OF THE INVENTION

The present invention relates to a control device, and more particularly to a menu control device for operating and controlling a menu shown on an electronic device.

BACKGROUND OF THE INVENTION

Generally, during the live broadcast process, the live broadcaster may connect a variety of electronic devices with a live broadcast box control device. In addition, the live broadcaster may control these electronic devices through the live broadcast box control device. For example, during the live broadcast process, if the live broadcaster wants to set various scenarios (e.g., the ambient sound effect) or the live broadcaster wants to share videos, texts or music with online fans, the live broadcaster may perform an item browsing operation, an item selecting operation or any other appropriate controlling operation on the menu shown on the electronic device through the live broadcast box control device. Consequently, the required function can be selected and executed.

However, due to the structural limitations, the conventional live broadcast box control device still has some drawbacks. For example, when the live broadcaster operates and controls the menu shown on the electronic device through the live broadcast box control device, for example performs the item browsing operation, the live broadcaster needs to operate the upper key, the down key, the left key and the right key to achieve this purpose. Moreover, when the live broadcaster performs the item selecting operation, the live broadcaster needs to operate another key. In other words, the conventional live broadcast box control device is not convenient for the live broadcaster to control the live atmosphere of the live broadcast in real time.

Therefore, there is a need of providing an improved menu control device in order to overcome the drawbacks of the conventional technologies.

SUMMARY OF THE INVENTION

The present invention provides a menu control device. The menu control device includes a roller module. A menu shown on an electronic device can be quickly and conveniently operated and controlled through a roller module of the menu control device.

The other objects and advantages of the present invention will be understood from the disclosed technical features.

In accordance with an aspect of the present invention, a menu control device is provided. The menu control device is used for controlling a menu shown on an electronic device is provided. The menu control device includes a casing and a roller module. The roller module is installed in the casing. The roller module includes a base, at least one elastic supporting arm, at least one scroll wheel, at least one encoder, at least one switch element and a microprocessor. The at least one elastic supporting arm is connected with the base. A rotation shaft of each scroll wheel is pivotally coupled to the corresponding elastic supporting arm. A portion of each scroll wheel is exposed outside the casing. Each scroll wheel is rotated in response to an external pushing force. The at least one encoder is located beside the corresponding scroll wheel. Each encoder generates an encoding signal when the corresponding scroll wheel is rotated. The at least one switch element is located under the corresponding elastic supporting arm. When an external pressing force is applied to one of the at least one scroll wheel and the corresponding elastic supporting arm is swung toward the corresponding switch element, the corresponding switch element is triggered by the corresponding elastic supporting arm, and a switching signal is generated by the corresponding switch element. The microprocessor is electrically connected with the at least one encoder and the at least one switch element. The microprocessor performs an item browsing operation on the menu according to the encoding signal. The microprocessor performs an item selecting operation on the menu according to the switching signal.

In an embodiment, each of the at least one elastic supporting arm includes a connecting part, a pivotal part and a triggering part. The connecting part is connected with the base. The pivotal part has a pivotal hole. The rotation shaft of the corresponding scroll wheel is penetrated through the pivotal hole and pivotally coupled to the pivotal part. The triggering part is connected between the connecting part and the pivotal part, and aligned with the corresponding switch element. When one of the at least one elastic supporting arm is swung toward the corresponding switch element, the corresponding switch element is triggered by the triggering part of the elastic supporting arm.

In an embodiment, each of the at least one switch element includes a first lateral side and a second lateral side, which are opposed to each other. The first lateral side of the switch element is away from the rotation shaft of the corresponding scroll wheel. The second lateral side of the switch element is close to the rotation shaft of the corresponding scroll wheel. There is a gap between the second lateral side of the switch element and the rotation shaft of the corresponding scroll wheel.

In an embodiment, the roller module further includes at least one illumination module, and each of the at least one illumination module is located beside the corresponding switch element and electrically connected with the microprocessor. When the microprocessor performs the item selecting operation on the menu according to the switching signal, the microprocessor controls the corresponding illumination module to emit a light beam.

In an embodiment, each of the at least one illumination module includes a light-guiding post, a light-transmissible cover and a light-emitting element. The light-guiding post penetrated through the base. A portion of the light-guiding post is exposed outside the casing. The light-transmissible cover is installed on the casing. The portion of the light-guiding post exposed outside the casing is covered by the light-transmissible cover. The light-emitting element is electrically connected with the microprocessor. The light-guiding post is arranged between the light-emitting element and the light-transmissible cover. When the microprocessor performs the item selecting operation on the menu according to the switching signal, the microprocessor controls the light-emitting element of the corresponding illumination module to emit the light beam, and the light beam is transferred to the light-transmissible cover through the light-guiding post.

In an embodiment, the at least one elastic supporting arm includes plural elastic supporting arms, the at least one scroll wheel includes plural scroll wheels, the at least one encoder includes plural encoders, the at least one switch element includes plural switch elements, and the at least one illumination module includes plural illumination modules. The plural elastic supporting arms are connected with the base and sequentially arranged on the base. Each of the plural scroll wheels is pivotally coupled to the corresponding elastic supporting arm through the corresponding rotation shaft. The plural switch elements are respectively located under the corresponding elastic supporting arms. The plural illumination modules are respectively located beside the corresponding switch elements.

In an embodiment, the roller module further includes a circuit board. The circuit board and the base are assembled with each other. The microprocessor, the at least one encoder, the at least one switch element and the at least one illumination module are installed on the circuit board. The at least one encoder, the at least one switch element and the at least one illumination module are electrically connected with the microprocessor through the circuit board.

In an embodiment, n the roller module further includes at least one fastening element, and the base is assembled with the circuit board through the at least one fastening element.

From the above descriptions, the present invention provides the menu control device. In response to an external pushing force, the scroll wheel of the roller module is rotated and the encoder generates an encoding signal. Moreover, when an external pressing force is applied to the scroll wheel of the roller module, the switch element is triggered to generate a switching signal. According to the switching signal, the item browsing operation or the item selecting operation can be performed on the menu shown on the electronic device. Due to this structural design, the user can operate the same scroll wheel to control the menu shown on the electronic device. Consequently, the using convenience is largely enhanced. Moreover, infinite numbers of the elastic supporting arms, the scroll wheels, the encoders, the switch elements and the illumination modules of the roller module may be sequentially arranged according to the practical requirements. Consequently, the practicing and the application level of the menu control device are largely expanded.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
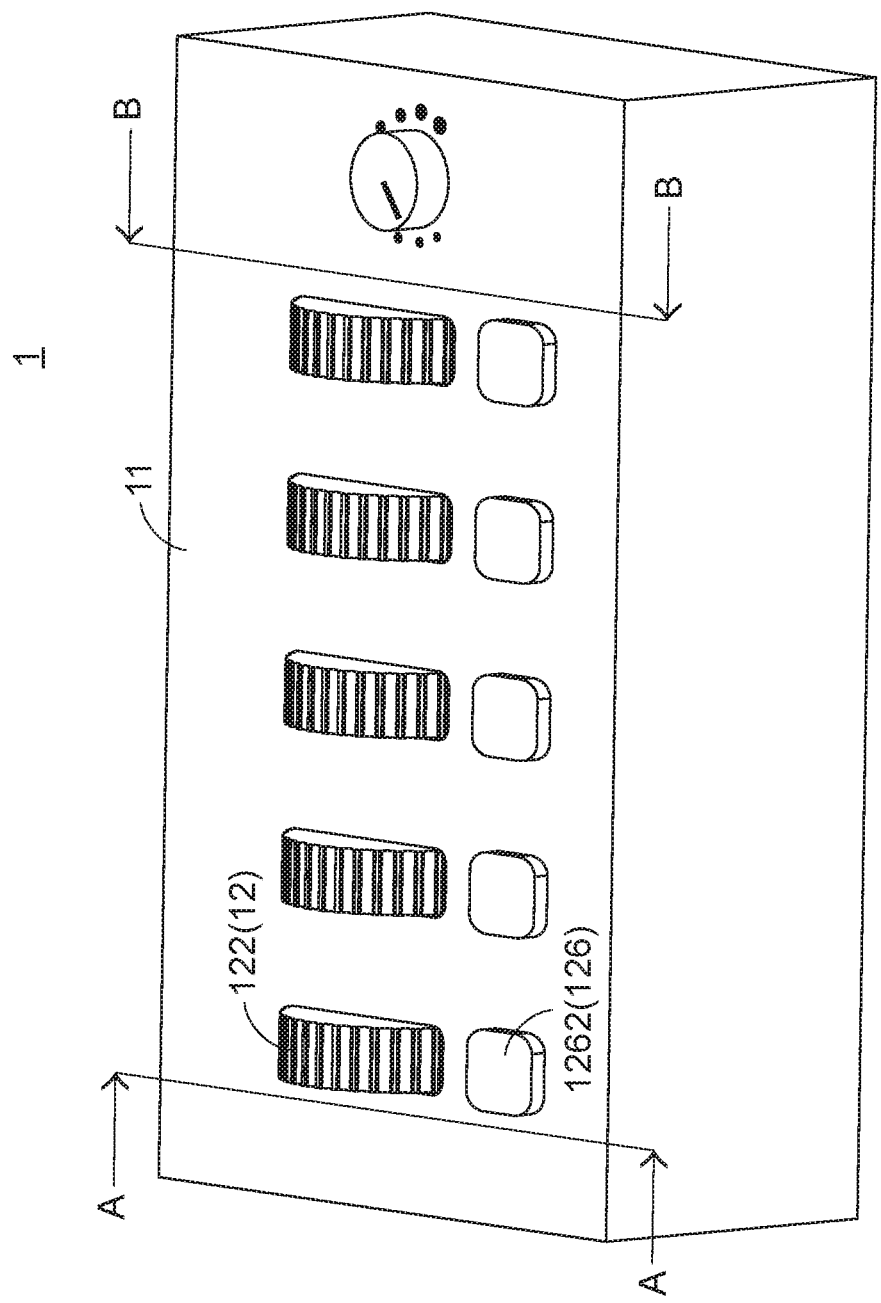
FIG. 1 is a schematic perspective view illustrating the appearance of a menu control device according to an embodiment of the present invention.
Figure 2:
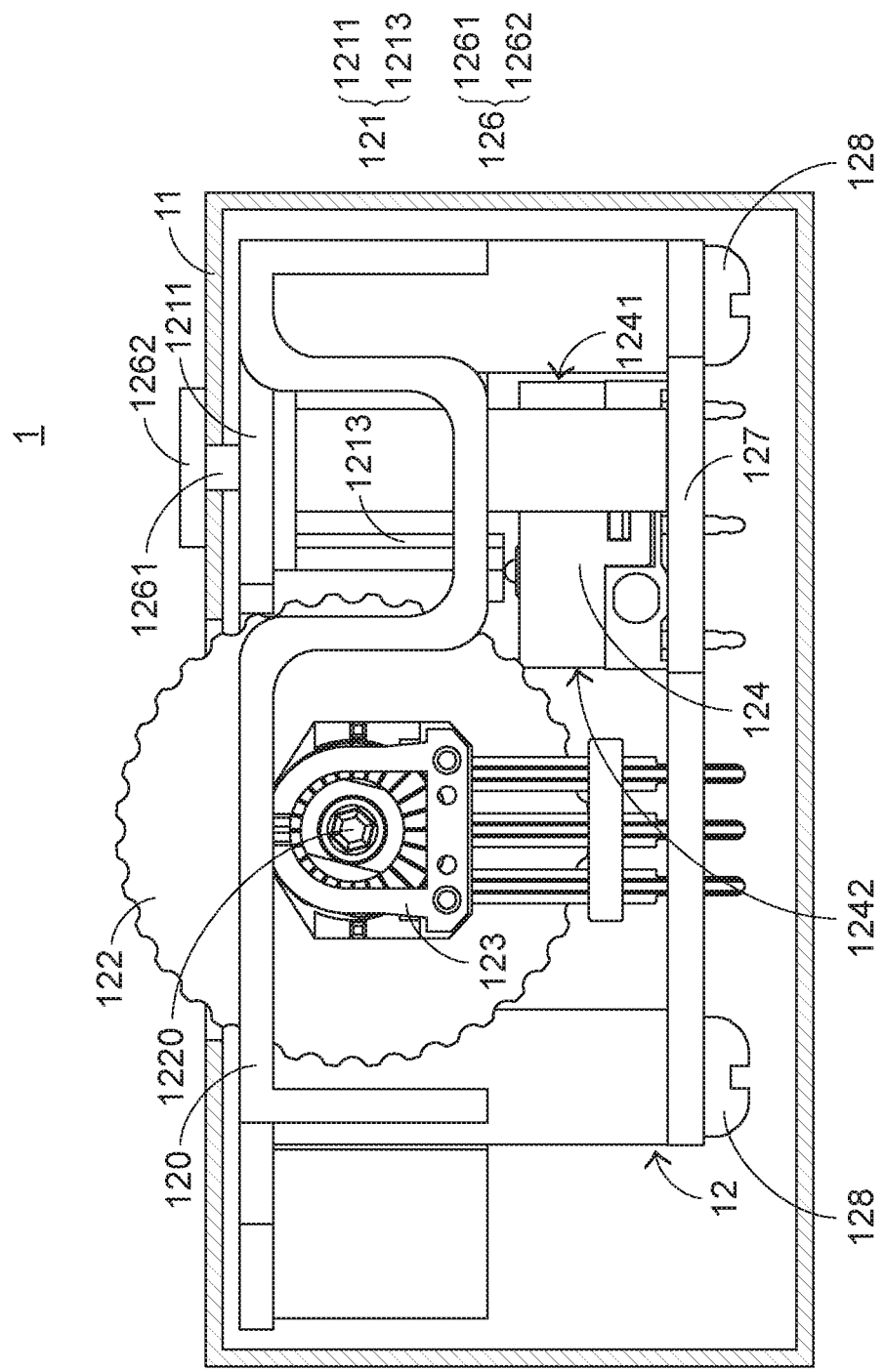
FIG. 2 is a schematic cross-sectional view illustrating the menu control device as shown in FIG. 1 and taken along the line AA.
Figure 3:
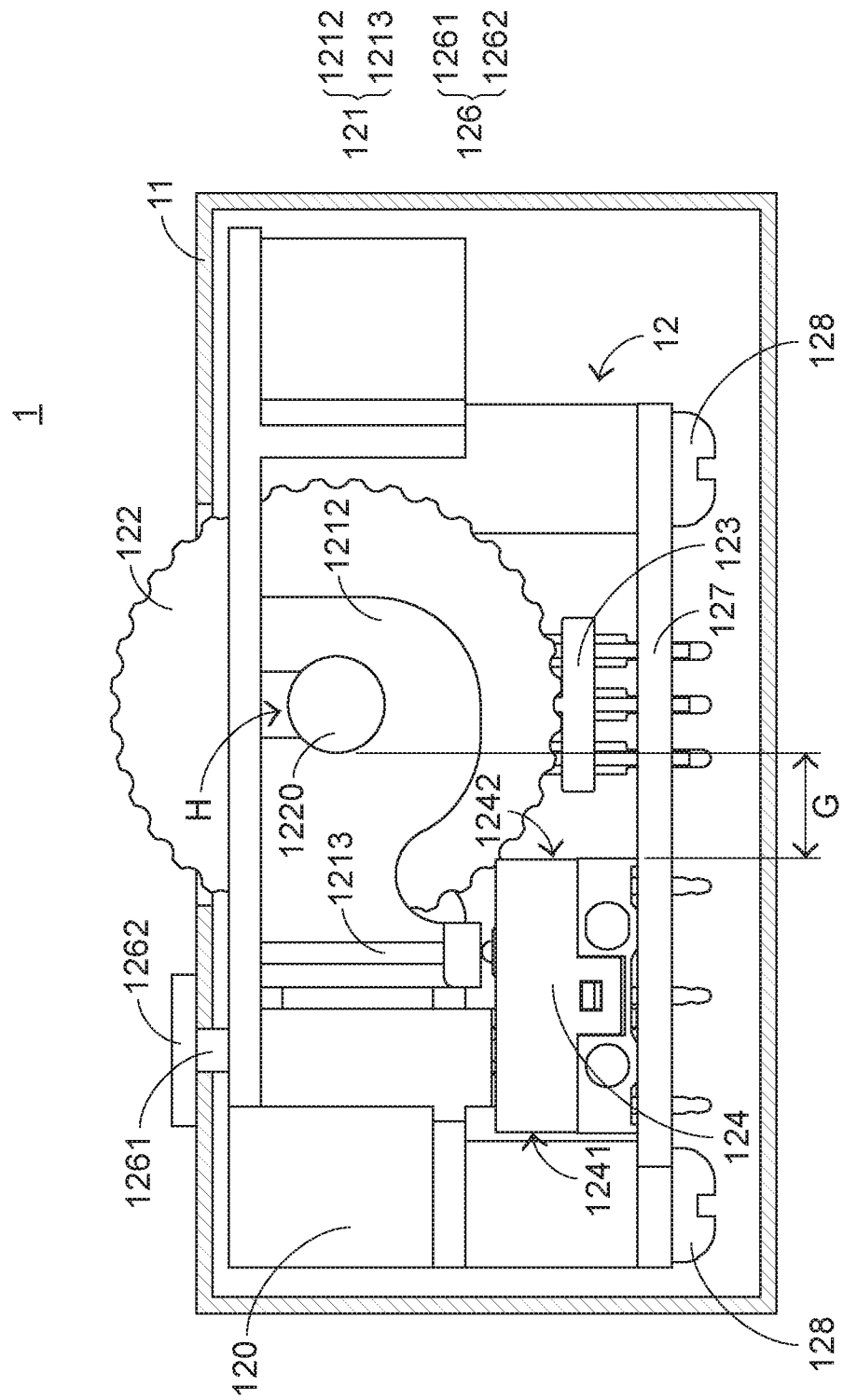
FIG. 3 is a schematic cross-sectional view illustrating the menu control device as shown in FIG. 1 and taken along the line BB.
Figure 4:
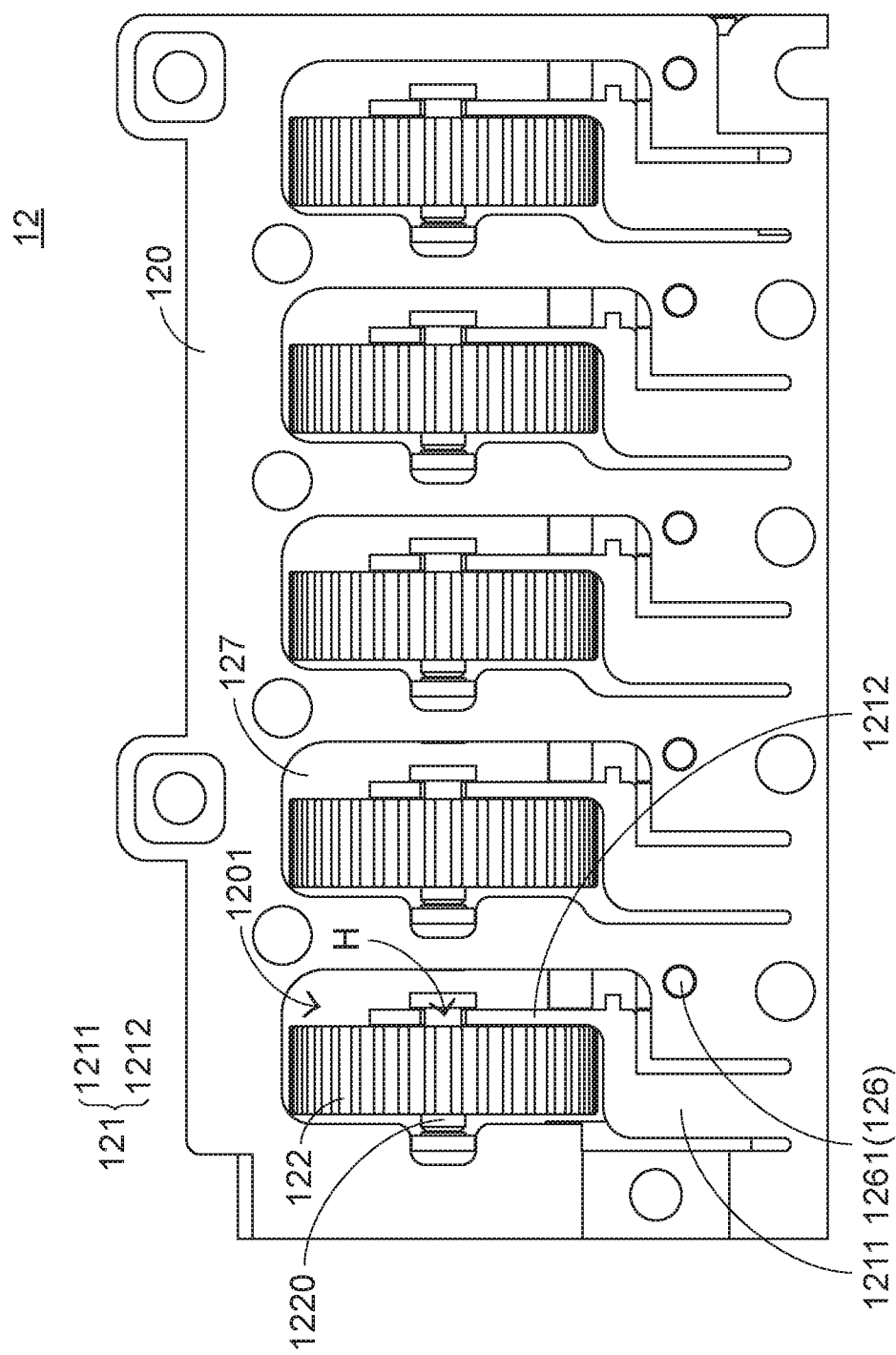
FIG. 4 is a schematic top view illustrating the roller module of the menu control device as shown in FIG. 2.
Figure 5:
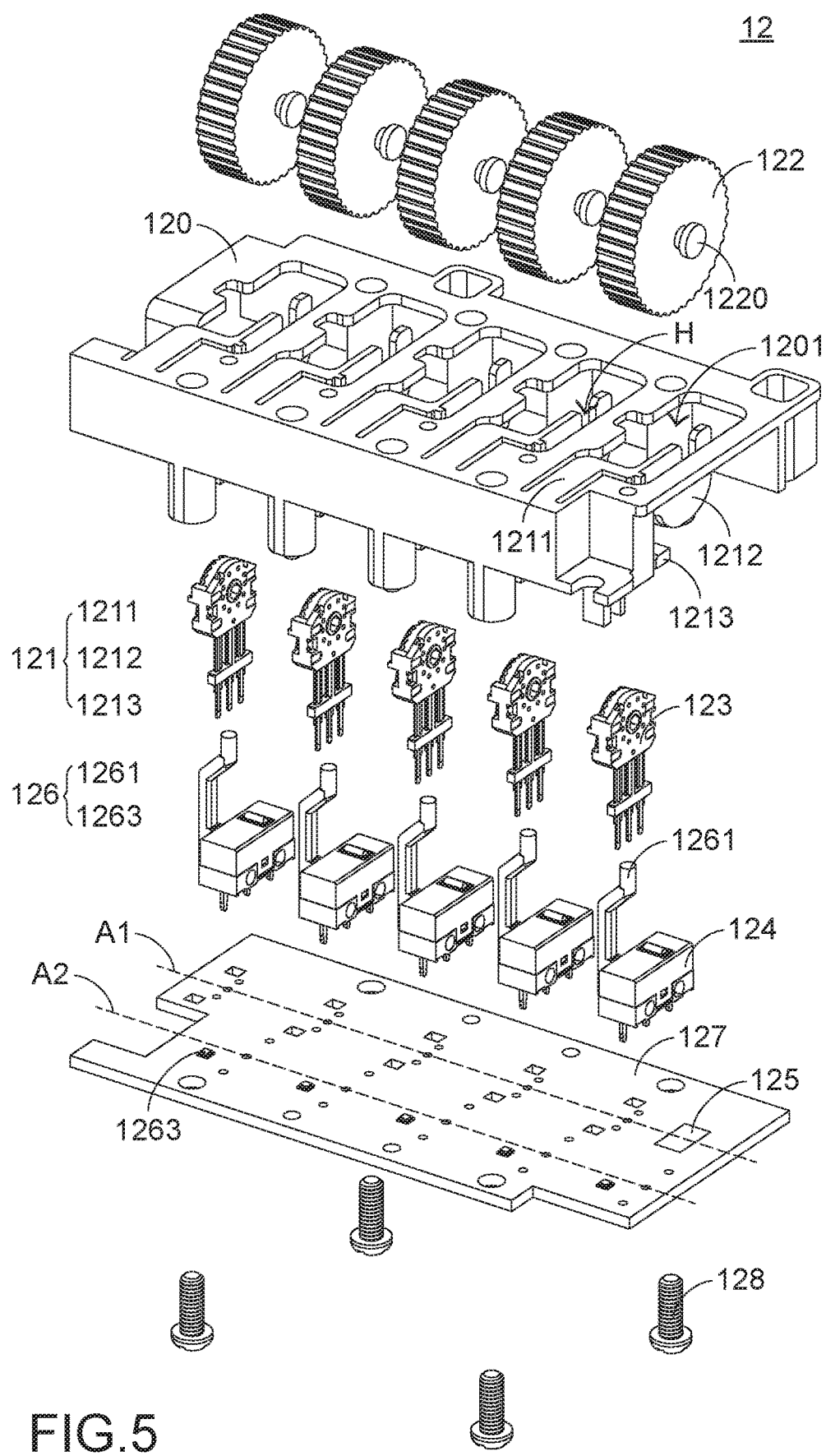
FIG. 5 is a schematic exploded view illustrating the roller module of the menu control device as shown in FIG. 2.
Figure 6:
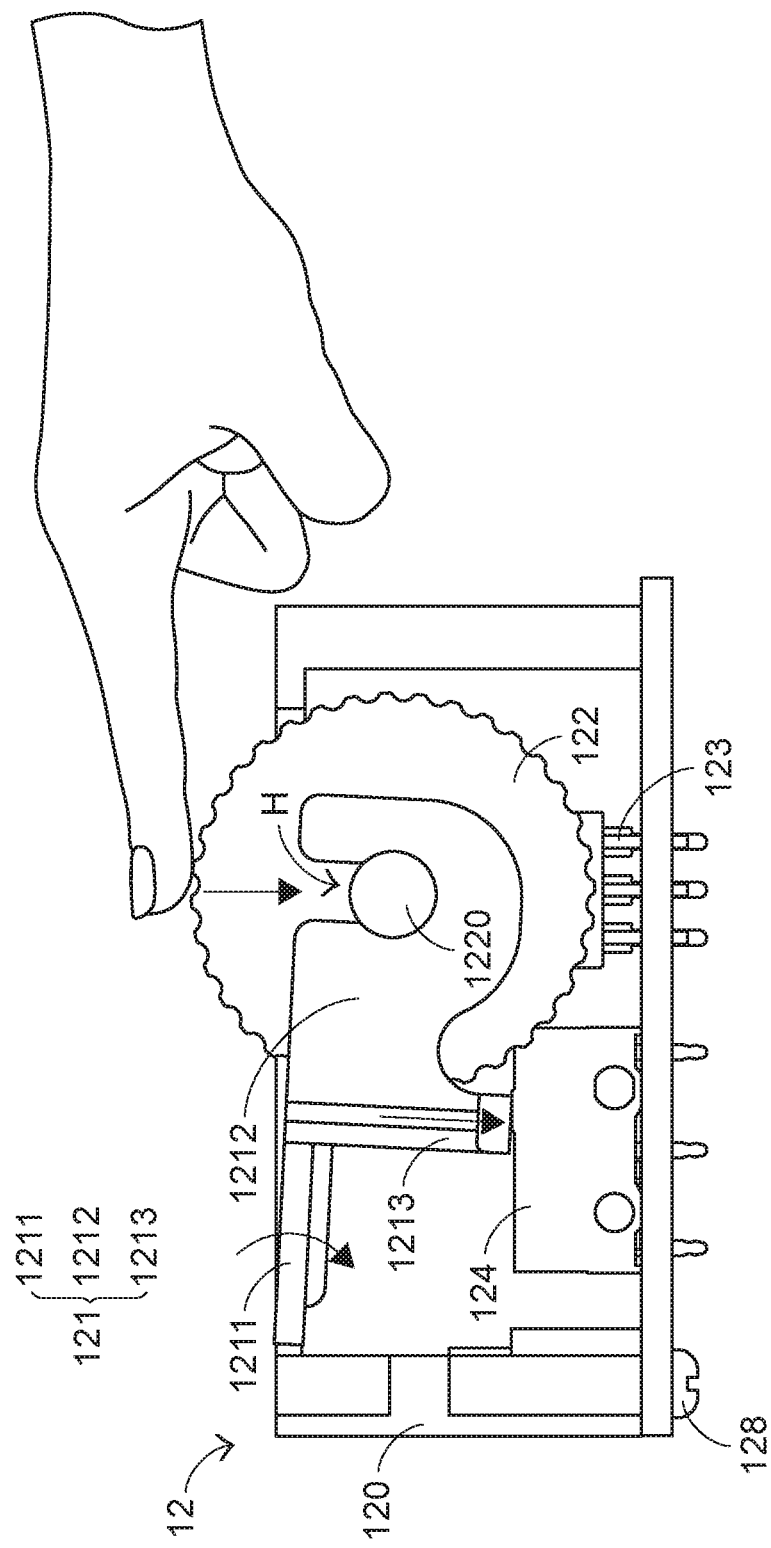
FIG. 6 schematically illustrates the operations of the roller module of the menu control device as shown in FIG. 2.

Please refer to FIGS. 1, 2, 3, 4, 5 and 6. FIG. 1 is a schematic perspective view illustrating the appearance of a menu control device according to an embodiment of the present invention. FIG. 2 is a schematic cross-sectional view illustrating the menu control device as shown in FIG. 1 and taken along the line AA. FIG. 3 is a schematic cross-sectional view illustrating the menu control device as shown in FIG. 1 and taken along the line BB. FIG. 4 is a schematic top view illustrating the roller module of the menu control device as shown in FIG. 2. FIG. 5 is a schematic exploded view illustrating the roller module of the menu control device as shown in FIG. 2. FIG. 6 schematically illustrates the operations of the roller module of the menu control device as shown in FIG. 2.

As shown in FIGS. 1, 2, 3, 4, 5 and 6, the menu control device 1 is used to operate and control a menu shown on an electronic device. The menu control device 1 comprises a casing 11 and a roller module 12.

The roller module 12 is installed within the casing 11. In an embodiment, the roller module 12 comprises a base 120, at least one elastic supporting arm 121, at least one scroll wheel 122, at least one encoder 123, at least one switch element 124 and a microprocessor 125.

The elastic supporting arm 121 is connected with the base 120. A rotation shaft 1220 of the scroll wheel 122 is pivotally coupled to the corresponding elastic supporting arm 121. Moreover, a portion of the scroll wheel 122 is exposed outside the casing 11. In an embodiment, the scroll wheel 122 is rotated in response to an external pushing force applied by the user. Moreover, when an external pressing force is applied to the scroll wheel 122 by the user, the corresponding elastic supporting arm 121 is swung accordingly.

The encoder 123 is located beside the corresponding scroll wheel 122. In response to the rotation of the scroll wheel 122, the encoder 123 generates an encoding signal.

The switch element 124 is located under the corresponding elastic supporting arm 121. When the external pressing force is applied to the scroll wheel 122 by the user and the corresponding elastic supporting arm 121 is swung toward the corresponding switch element 124, the switch element 124 is triggered by the elastic supporting arm 121. Consequently, the switch element 124 generates a switching signal.

The microprocessor 125 is electrically connected with the encoder 123 and the switch element 124. According to the encoding signal from the encoder 123, the microprocessor 125 performs an item browsing operation on the menu shown on the electronic device. According to the switching signal from the switch element 124, the microprocessor 125 performs an item selecting operation on the menu shown on the electronic device.

The other structure of the roller module 12 will be described in more details as follows.

Please refer to FIGS. 2, 3, 4, 5 and 6 again. In an embodiment, the elastic supporting arm 21 comprises a connecting part 1211, a pivotal part 1212 and a triggering part 1213.

The connecting part 1211 is connected with the base 120. The pivotal part 1212 has a pivotal hole H. The rotation shaft 1220 of the scroll wheel 122 is penetrated through the pivotal hole H. Consequently, the scroll wheel 122 is pivotally coupled to the pivotal part 1212. The triggering part 1213 is connected between the connecting part 1211 and the pivotal part 1212. In addition, the triggering part 1213 is aligned with the corresponding switch element 124. When the external pressing force is applied to the scroll wheel 122 by the user and the corresponding elastic supporting arm 121 is swung toward the corresponding switch element 124, the switch element 124 is triggered by the triggering part 1213 of the elastic supporting arm 21.

In an embodiment, the base 120 comprises at least one hollow portion 1201. The connecting part 1211 is connected with the base 120 and disposed within the hollow portion 1201. Consequently, the elastic supporting arm 121 can be swung in the hollow portion 1201 and relative to the base 120 by using the junction between the connecting part 1211 and the base 120 as a fulcrum.

Please refer to FIGS. 3, 5 and 6 again. In an embodiment, the switch element 124 comprises a first lateral side 1241 and a second lateral side 1242, which are opposed to each other. The first lateral side 1241 of the switch element 124 is away from the rotation shaft 1220 of the scroll wheel 122. The second lateral side 1242 of the switch element 124 is close to the rotation shaft 1220 of the scroll wheel 122. Moreover, there is a gap G between the second lateral side 1242 of the switch element 124 and the rotation shaft 1220 of the scroll wheel 122. That is, the switch element 124 and the rotation shaft 1220 of the scroll wheel 122 are not arranged side by side.

In an embodiment, plural scroll wheels 122, plural encoders 123 and plural switch elements 124 are sequentially arranged. In addition, the plural scroll wheels 122 and the plural encoders 123 are sequentially arranged along a first axial line A1, and the plural switch elements 124 are sequentially arranged along a second axial line A2. The second axial line A2 is in parallel with the first axial line A1. Due to this structural design, the overall thickness of the menu control device can be effectively reduced.

Please refer to FIGS. 1, 2, 3, 4 and 5 again. In an embodiment, the roller module 12 further comprises at least one illumination module 126. Each illumination module 126 is located beside the corresponding switch element 124 and electrically connected with the microprocessor 125. When the microprocessor 125 performs the item selecting operation on the menu according to the switching signal from the switch element 124, the microprocessor 125 also controls the corresponding illumination module 126 to emit a light beam. In an embodiment, the illumination module 126 comprises a light-guiding post 1261, a light-transmissible cover 1262 and a light-emitting element 1263. The light-guiding post 1261 is penetrated through the base 120. In addition, a portion of the light-guiding post 1261 is exposed outside the casing 11. The light-transmissible cover 1262 is installed on the casing 11. In addition, the exposed portion of the light-guiding post 1261 is covered by the light-transmissible cover 1262. The light-emitting element 1263 is electrically connected with the microprocessor 125. In addition, the light-guiding post 1261 is arranged between the light-emitting element 1263 and the light-transmissible cover 1262. When the microprocessor 125 performs the item selecting operation on the menu according to the switching signal from the switch element 124, the microprocessor 125 also controls the light-emitting element 1263 to emit the light beam. The light beam is transferred to the light-transmissible cover 1262 through the light-guiding post 1261. As mentioned above, the light-guiding post 1261 is disposed within the base 120. Consequently, when the light beam is transferred through the light-guiding post 1261, the light beam is not leaked out of the outsides of the base 120 and the casing 11.

Please refer to FIGS. 2, 3, 5 and 6 again. In an embodiment, the roller module 12 further comprises a circuit board 127. The circuit board 127 and the base 120 are assembled with each other. The at least one encoder 123, the at least one switch element 124, the at least one illumination module 126 and the microprocessor 125 are all installed on the circuit board 127. In addition, the at least one encoder 123, the at least one switch element 124 and the at least one illumination module 126 are electrically connected with the microprocessor 125 through the circuit board 127. In an embodiment, the roller module 12 further comprises at least one fastening element 128. The base 120 is assembled with the circuit board 127 through the at least one fastening element 128. In this embodiment, the roller module 12 further comprises four fastening elements 128. It is noted that the number of the fastening elements 128 is not restricted. That is, the number of the fastening elements 128 may be increased or decreased according to the practical requirements.

In an embodiment, the roller module 12 comprises five elastic supporting arms 121, five scroll wheels 122, five encoders 123, five switch elements 124 and five illumination modules 126. These elastic supporting arms 121 are connected with the base 120 and sequentially arranged on the base 120. The rotation shafts 1220 of these scroll wheels 122 are respectively coupled to the corresponding elastic supporting arms 121. These encoders 123 are respectively located beside the corresponding scroll wheels 122. In addition, these encoders 123 are sequentially arranged on the circuit board 127 and electrically connected with the circuit board 127. These switch elements 124 are respectively located under the corresponding elastic supporting arms 121. In addition, these switch elements 124 are sequentially arranged on the circuit board 127 and electrically connected with the circuit board 127. These illumination modules 126 are respectively located beside the corresponding switch elements 124. In addition, these illumination modules 126 are sequentially arranged on the circuit board 127 and electrically connected with the circuit board 127. It is noted that the numbers of the elastic supporting arms 121, the scroll wheels 122, the encoders 123, the switch elements 124 and the illumination modules 126 are not restricted. That is, the numbers of these components may be increased or decreased according to the practical requirements.

Figure 7:
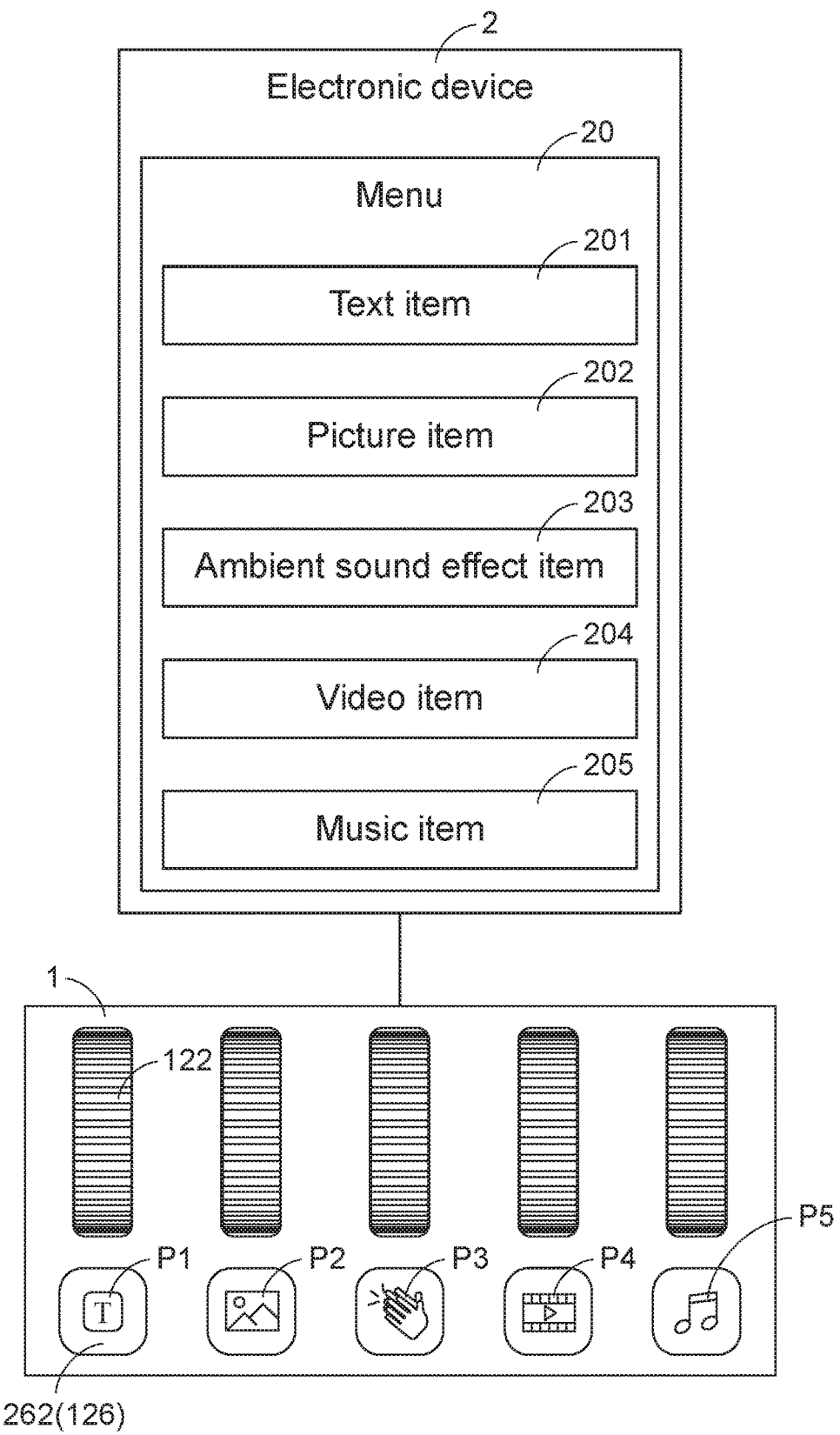
FIG. 7 schematically illustrates the use of the menu control device to operate and control the menu shown on the electronic device.

FIG. 7 schematically illustrates the use of the menu control device to operate and control the menu shown on the electronic device. Please refer to FIG. 7 and also refer to FIGS. 2, 3, 4, 5 and 6. The menu control device 1 is in communication with the electronic device 2 in a wired transmission manner or a wireless transmission manner. In addition, the menu 20 shown on the electronic device 1 can be operated and controlled by the user through the menu control device 1. For example, the menu control device 1 is a live broadcast box control device used by a live broadcaster (i.e., a user) during live broadcast. Preferably but not exclusively, the electronic device 2 is a notebook computer. When the live broadcaster intends to perform an item browsing operation on the menu 20 shown on the notebook computer 2, the live broadcaster can perform the browsing movement between a text item 201, a picture item 202, an ambient sound effect item 203, a video item 204 and a music item 205 in the menu 20. For example, the live broadcaster may rotate one of the plural scroll wheels 122 to perform the browsing movement between the plural items in the menu 20. When the live broadcaster intends to perform an item selecting operation on the menu 20 shown on the notebook computer 2, it means that the live broadcaster intends to select one of the text item 201, the picture item 202, the ambient sound effect item 203, the video item 204 and the music item 205 in the menu 20. For achieving this purpose, the live broadcaster may directly press down the same scroll wheel 122 to select one of the plural items in the menu 20.

In an embodiment, the icons P1, P2, P3, P4 and P5 of plural items of the menu 20 are respectively shown on the light-transmissible covers 1262 of the plural illumination modules 126. For example, when the live broadcaster presses the scroll wheel 122 and selects the ambient sound effect item 203 in the menu 20, the microprocessor 125 controls the corresponding light-emitting element 1263 to emit a light beam. The light beam is transferred to the corresponding light-transmissible cover 1262 through the corresponding light-guiding post 1261. Under this circumstance, the icon P3 on the corresponding light-guiding post 1261 is illuminated by the light beam. The illuminated icon P3 can prompt the user of the currently selected item.

In case that plural different application programs are executed on the notebook computer and plural different types of menus (such as conference system menus, restaurant ordering menus, or shopping menus) are shown, these different types of menus can be operated and controlled through the corresponding scroll wheels 122. The icons shown on the light-transmissible covers 1262 of the plural illumination modules 126 are charged to the icons corresponding to the different types.

From the above descriptions, the present invention provides the menu control device. In response to an external pushing force, the scroll wheel of the roller module is rotated and the encoder generates an encoding signal. Moreover, when an external pressing force is applied to the scroll wheel of the roller module, the switch element is triggered to generate a switching signal. According to the switching signal, the item browsing operation or the item selecting operation can be performed on the menu shown on the electronic device. Due to this structural design, the user can operate the same scroll wheel to control the menu shown on the electronic device. Consequently, the using convenience is largely enhanced. Moreover, infinite numbers of the elastic supporting arms, the scroll wheels, the encoders, the switch elements and the illumination modules of the roller module may be sequentially arranged according to the practical requirements. Consequently, the practicing and the application level of the menu control device are largely expanded.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A menu control device for controlling a menu shown on an electronic device, the menu control device comprising:
a casing; and
a roller module installed in the casing, wherein the roller module comprises:
a base;
at least one elastic supporting arm connected with the base;
at least one scroll wheel, wherein a rotation shaft of each scroll wheel is pivotally coupled to the corresponding elastic supporting arm, wherein a portion of each scroll wheel is exposed outside the casing, and each scroll wheel is rotated in response to an external pushing force;
at least one encoder located beside the corresponding scroll wheel, wherein each encoder generates an encoding signal when the corresponding scroll wheel is rotated;
at least one switch element located under the corresponding elastic supporting arm, wherein when an external pressing force is applied to one of the at least one scroll wheel and the corresponding elastic supporting arm is swung toward the corresponding switch element, the corresponding switch element is triggered by the corresponding elastic supporting arm, and a switching signal is generated by the corresponding switch element;
a microprocessor electrically connected with the at least one encoder and the at least one switch element, wherein the microprocessor performs an item browsing operation on the menu according to the encoding signal, and the microprocessor performs an item selecting operation on the menu according to the switching signal; and
at least one illumination module, and each of the at least one illumination module is located beside the corresponding switch element and electrically connected with the microprocessor, wherein when the microprocessor performs the item selecting operation on the menu according to the switching signal, the microprocessor controls the corresponding illumination module to emit a light beam.

2. The menu control device according to claim 1, wherein each of the at least one elastic supporting arm comprises:
a connecting part connected with the base;
a pivotal part having a pivotal hole, wherein the rotation shaft of the corresponding scroll wheel is penetrated through the pivotal hole and pivotally coupled to the pivotal part; and
a triggering part connected between the connecting part and the pivotal part, and aligned with the corresponding switch element, wherein when one of the at least one elastic supporting arm is swung toward the corresponding switch element, the corresponding switch element is triggered by the triggering part of the elastic supporting arm.

3. The menu control device according to claim 1, wherein each of the at least one switch element comprises a first lateral side and a second lateral side, which are opposed to each other, wherein the first lateral side of the switch element is away from the rotation shaft of the corresponding scroll wheel, and the second lateral side of the switch element is close to the rotation shaft of the corresponding scroll wheel, wherein there is a gap between the second lateral side of the switch element and the rotation shaft of the corresponding scroll wheel.

4. The menu control device according to claim 1, wherein each of the at least one illumination module comprises:
a light-guiding post penetrated through the base, wherein a portion of the light-guiding post is exposed outside the casing;
a light-transmissible cover installed on the casing, wherein the portion of the light-guiding post exposed outside the casing is covered by the light-transmissible cover; and
a light-emitting element electrically connected with the microprocessor, wherein the light-guiding post is arranged between the light-emitting element and the light-transmissible cover, wherein when the microprocessor performs the item selecting operation on the menu according to the switching signal, the microprocessor controls the light-emitting element of the corresponding illumination module to emit the light beam, and the light beam is transferred to the light-transmissible cover through the light-guiding post.

5. The menu control device according to claim 1, wherein the at least one elastic supporting arm comprises plural elastic supporting arms, the at least one scroll wheel comprises plural scroll wheels, the at least one encoder comprises plural encoders, the at least one switch element comprises plural switch elements, and the at least one illumination module comprises plural illumination modules, wherein the plural elastic supporting arms are connected with the base and sequentially arranged on the base, each of the plural scroll wheels is pivotally coupled to the corresponding elastic supporting arm through the corresponding rotation shaft, the plural switch elements are respectively located under the corresponding elastic supporting arms, and the plural illumination modules are respectively located beside the corresponding switch elements.

6. The menu control device according to claim 1, wherein the roller module further comprises a circuit board, and the circuit board and the base are assembled with each other, wherein the microprocessor, the at least one encoder, the at least one switch element and the at least one illumination module are installed on the circuit board, and the at least one encoder, the at least one switch element and the at least one illumination module are electrically connected with the microprocessor through the circuit board.

7. The menu control device according to claim 6, wherein the roller module further comprises at least one fastening element, and the base is assembled with the circuit board through the at least one fastening element.

\* \* \* \* \*